Jan. 3, 1933.  W. A. DEL MAR  1,892,663
METHOD OF AND APPARATUS FOR IMPROVING THE ELECTRICAL PROPERTIES OF CABLES
Filed April 3, 1929  2 Sheets-Sheet 1
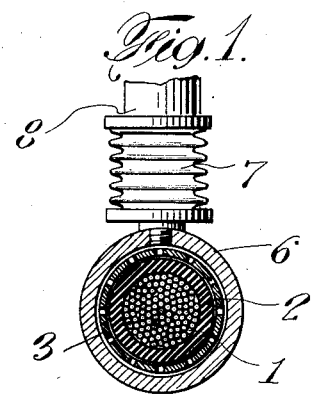
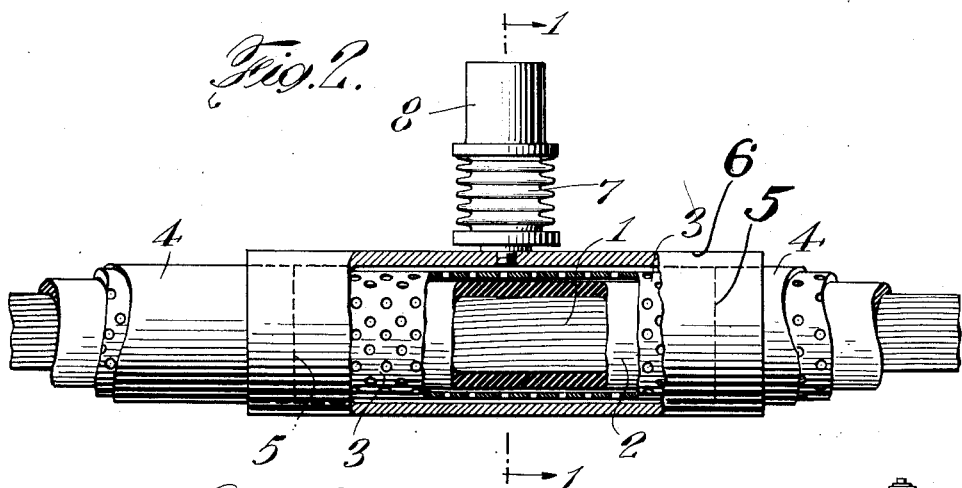
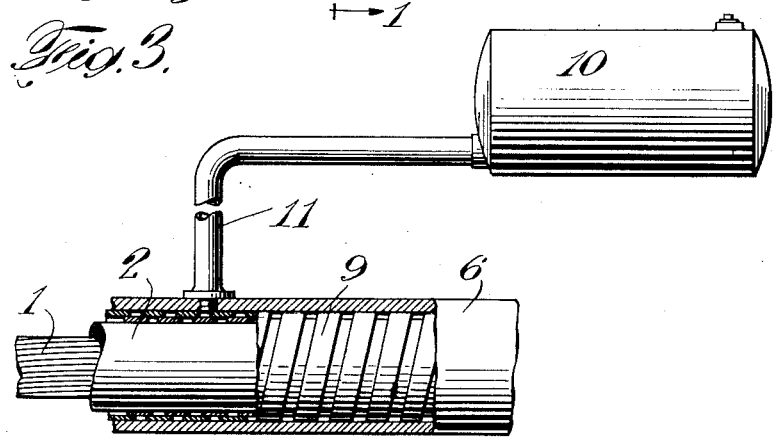
Inventor
William A. Del Mar
By his Attorneys
Cooper, Kerr & Dunham

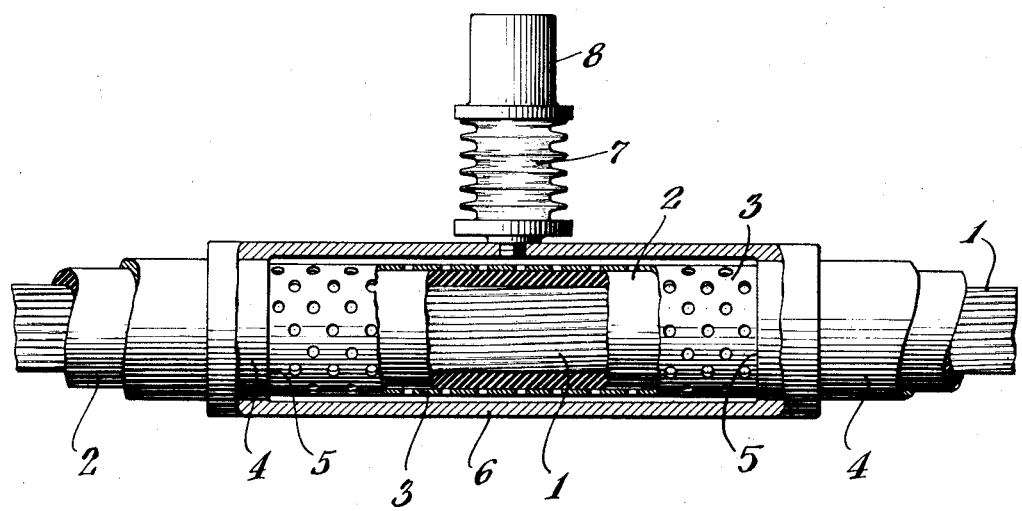

Patented Jan. 3, 1933

1,892,663

UNITED STATES PATENT OFFICE

WILLIAM A. DEL MAR, OF GREENWICH, CONNECTICUT, ASSIGNOR TO HABIRSHAW CABLE & WIRE CORPORATION, OF NEW YORK, N. Y., A CORPORATION OF NEW YORK

METHOD OF AND APPARATUS FOR IMPROVING THE ELECTRICAL PROPERTIES OF CABLES

Application filed April 3, 1929. Serial No. 352,156.

The present invention relates to electric cables or conductors of the high tension type, and more particularly to cables of this type which are impregnated with fluid or liquid insulation materials such as oil, grease, or the like. Electric cables of the type referred to ordinarily comprise one or more electrical conductors, which are surrounded by suitable solid insulating material such, for example, as paper or the like, which insulation is in turn surrounded by an outer protective sheath, usually of lead.

In the manufacture of such electric cables it has been the practice to impregnate the solid insulating material with an insulating liquid or fluid such as oil or grease. The result is an improvement of the insulating or dielectric properties of the insulation, with resultant increase in the break-down voltage of the cable. An initial impregnation of the insulation is ordinarily accomplished prior to the application of the sheath. The sheath is then applied, its ends are sealed, and the cable is shipped and installed.

Due to various causes which may include the heating incident to application of the sheath, buckling of the sheath in handling, stretching of the sheath, and the like, so-called ionizable voids may be formed within the cable. These voids occur in the insulation between the conductors and the sheath, due to escape or absence of impregnating fluid, and may considerably and very undesirably decrease the dielectric resistance and/or break-down voltage of the insulation.

In my co-pending application Serial No. 271,641, filed April 20, 1928, which has resulted in Patent No. 1,731,297, issued Oct. 15, 1929, I have described and claimed a method and apparatus for completing and/or maintaining the impregnation of such a cable prior to splicing. The present invention relates to a method and apparatus for completing and/or maintaining the impregnation of such a cable more particularly after the cable has been installed. The present application relates to a method and apparatus adapted for application to a point or points on an installed cable, which points may be distant from, and not associated with, the splice, splices or ends, for accomplishing the results stated.

An object of the present invention is to provide a simple and efficient method and apparatus for completing and/or maintaining the impregnation of a fluid-impregnated cable. A further object is to provide such a method and apparatus which is applicable to installed cables and which may be applied independently of, and at a point or points distant from, the splice, splices or ends. Other objects of the present invention are to provide such a method and/or apparatus adapted to prevent the formation of ionizable voids in cables of the type referred to, and adapted to remove or destroy such voids in case they have formed; to provide such a method and/or apparatus adapted for maintaining a desired or predetermined pressure, whether atmospheric or otherwise, of insulating fluid or compound in such a cable; and to provide means permitting expansion or contraction of the insulating fluid or compound in such a cable, and for maintaining a desired or predetermined pressure of the same within the cable and preventing the formation of ionizable voids. Other objects of the present invention will appear from the following description.

According to the present invention the desired result is accomplished by the application of atmospheric, gravity, or other suitable pressure devices, such, for example, as sylphons or reservoirs, compressed air devices, or the like, to the cable itself, rather than to the splices or ends. An advantage of this arrangement is that it avoids the necessity for using splices of special construction as is the case when a pressure device is applied to a splice.

The present invention leaves the cable operator at liberty to use any type of splice, and permits the application of pressure devices to cables without changing existing splices. According to the present invention a portion of the lead or other outer sheath of the cable is removed, for a distance depending on the temperature cycle, the amount of oil in the cable, thickness of insulation and viscosity of oil, but which in general, does not exceed the length of an ordinary cable joint. If it is not already present, a suitable perforated or permeable metallic or metallized electrically conducting shield or sheath is then inserted in contact with the solid insulation where the outer sheath has been removed; a suitable closure sheath or box is applied to the cable to replace the removed portion of the sheath, but is preferably arranged so as to leave a space between its inner surface and the outer surface of the perforated or permeable metallic sheath, and a suitable pressure device such as a sylphon, reservoir, air tank or standpipe containing the desired insulating fluid, is applied to the device.

It is found by experiment that the application of pressure to such an opening or lung in a cable effects equalization of pressure at distant points.

In the drawings Fig. 1 shows a cross-section through a cable, approximately on line 1—1 of Fig. 2.

Fig. 2 is longitudinal view, partly in section, of a cable showing the device attached.

Fig. 3 is a detail showing a modified form which will be hereinafter described.

Fig. 4 is a view similar to Fig. 2, but illustrating the application of the invention to a cable having no metallic shield.

Referring to the parts in detail, 1 designates a conductor, 2 the insulation around same and 3 a perforated metallic sheath. The usual lead outer covering 4 is cut away between the dotted lines 5—5 and a jacket or casing 6 is applied as shown and attached to the said jacket is a collapsible reservoir or sylphon 7 which connects with the interior of the jacket and is provided with a suitable weight 8. The said weight exerts a pressure upon the contents of the sylphon and maintains the desired pressure within the cable.

In the case of cables already provided with perforated metallic sheathing over the insulation, it is of course unnecessary to add any special sheathing in order to apply this invention. In Fig. 2 I have shown the arrangement in which the cable was already provided with the metallic shield 3. As stated above, if it is not already present, a suitable perforated or permeable metallic or metallized electrically conducting shield is inserted in contact with the solid insulation where the outer sheath has been removed. This arrangement is shown in Fig. 4.

While perforated metallic sheathing appears to be the best material for this purpose, this invention also contemplates the use of any metal or metallized material which is sufficiently conducting to form an electrostatic shield, and will be sufficiently porous or permeable to permit the passage of oil. This would include a closely butted metal tape 9, without perforations, but with sufficient space between turns to permit the entrance of oil, as clearly shown in Fig. 3.

In place of the sylphon described and illustrated a suitable reservoir 10, connected by pipe 11 may be provided to maintain the internal pressure within the cable. Or a standpipe of oil may be substituted for either pressure means set forth.

Various other modifications may be employed without departing from the scope of this invention and it therefore is not intended to limit same to the particular embodiment shown and described.

What is claimed:—

1. Method of increasing the break-down voltage of an electric cable including an electrical conductor, an envelope of solid insulating material, and on outer protective sheath, after said cable has been installed and spliced, which comprises removing a portion of said sheath intermediate the splices, applying a permeable metallic shield to said solid insulating material, connecting a pressure reservoir with the interior of said sheath through the aperture formed by the removal of said portion thereof, applying a closure to said aperture in the sheath but spaced from said metallic shield, and confining a continuous body of liquid insulating material within said sheath and reservoir under sufficient pressure to diminish the tendency toward formation of ionizable voids.

2. Method of improving the operating characteristics of a high voltage unshielded single conductor electric cable, insulated with oil permeable solid material impregnated with liquid insulating material enclosed in a lead sheath in contact with the insulation, which comprises removing a short portion of the length of said sheath while leaving the remainder of the cable including the solid insulation intact, applying a permeable metallic shield to the bared solid insulating material, forming a chamber about said shield by attaching a tubular jacket to said sheath, said jacket extending over the metallic shield but spaced therefrom, confining a continuous body of oil within the chamber between the jacket and shield, and supplying oil through the shield to the solid insulation by exerting pressure on the confined oil.

In testimony whereof I hereto affix my signature.

WILLIAM A. DEL MAR.